Dec. 19, 1933. G. LAGANAS 1,940,597

SHOE SOLE LEVELING, SHAPING, AND SECURING MACHINE

Filed Sept. 21, 1932 9 Sheets-Sheet 1

Inventor
*George Laganas*

By *Geo. P. Kimmel*
Attorney

Dec. 19, 1933.  G. LAGANAS  1,940,597

SHOE SOLE LEVELING, SHAPING, AND SECURING MACHINE

Filed Sept. 21, 1932  9 Sheets-Sheet 2

Inventor
George Laganas
By Geo. P. Kimmel
Attorney

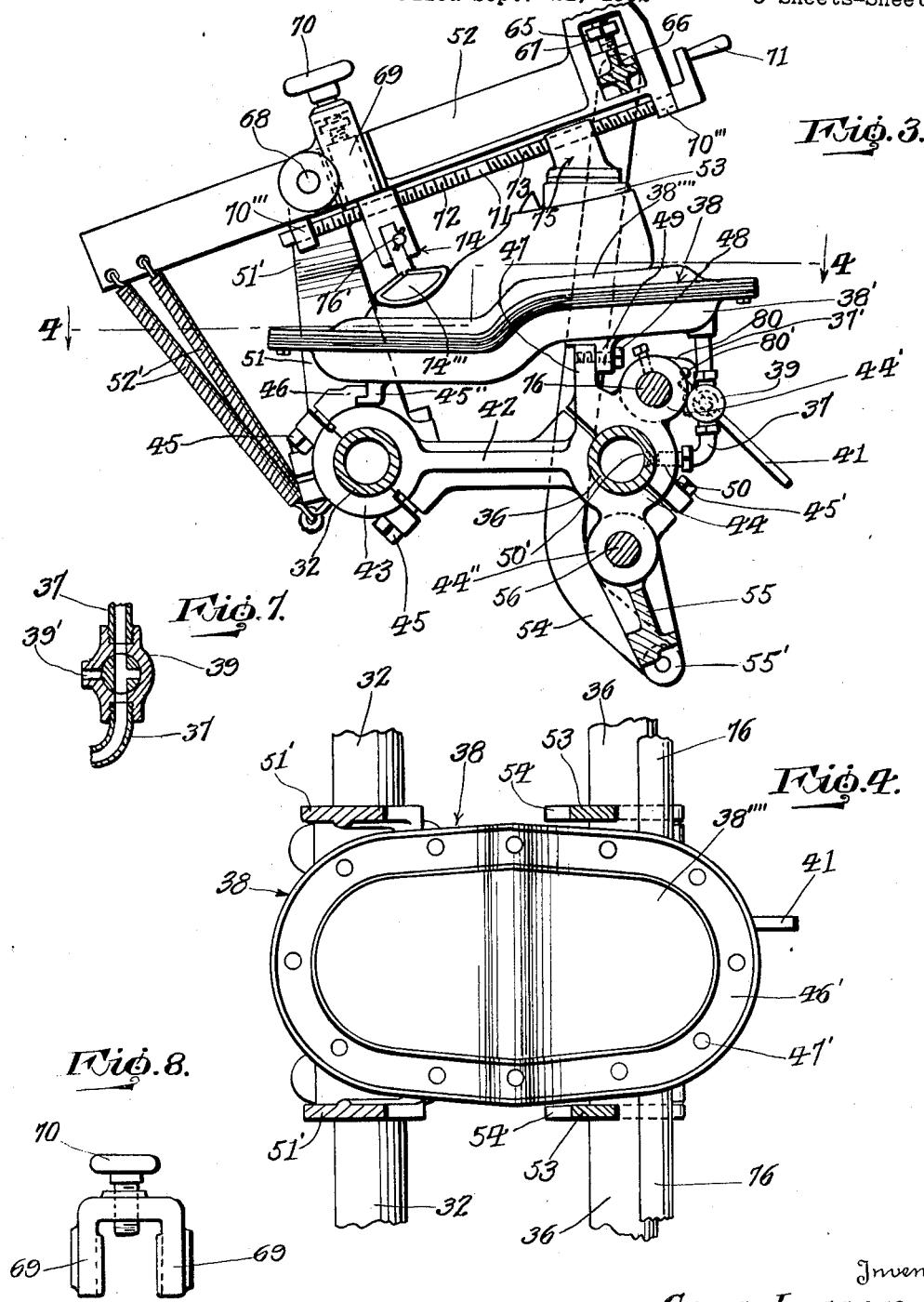

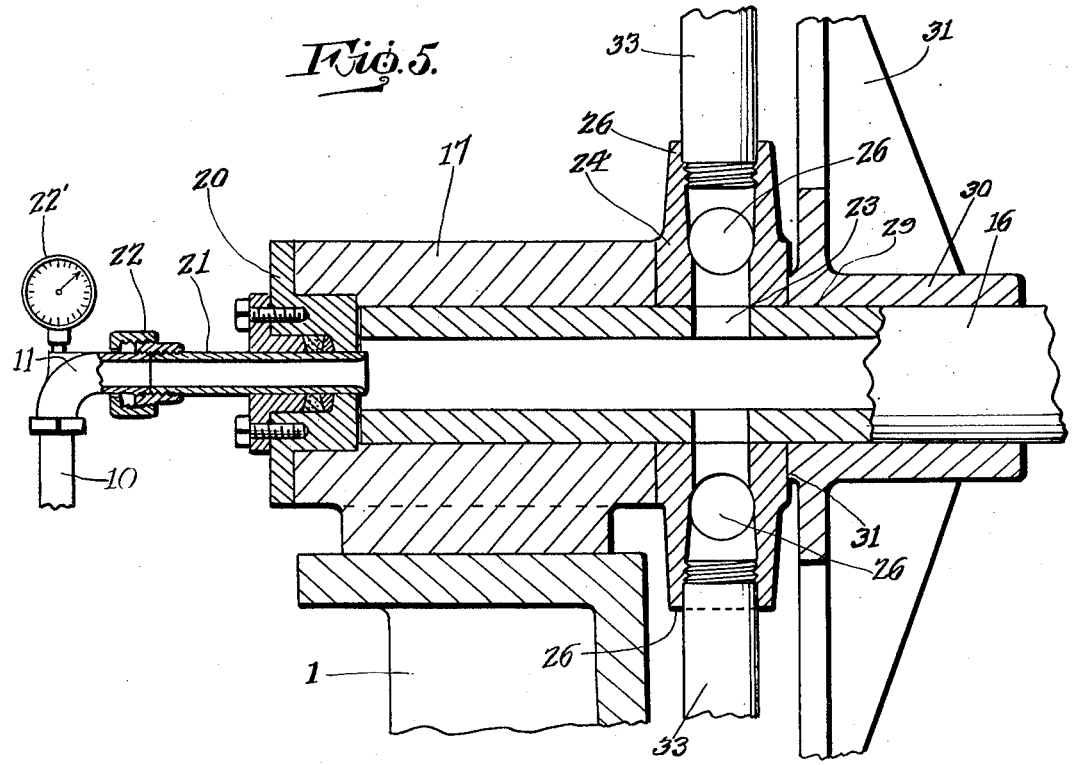
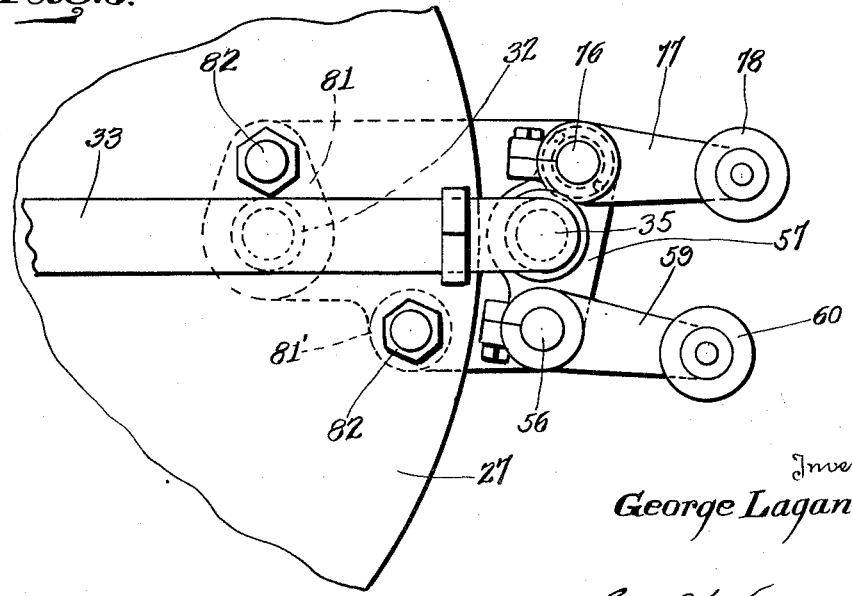

Dec. 19, 1933.  G. LAGANAS  1,940,597
SHOE SOLE LEVELING, SHAPING, AND SECURING MACHINE
Filed Sept. 21, 1932  9 Sheets-Sheet 5
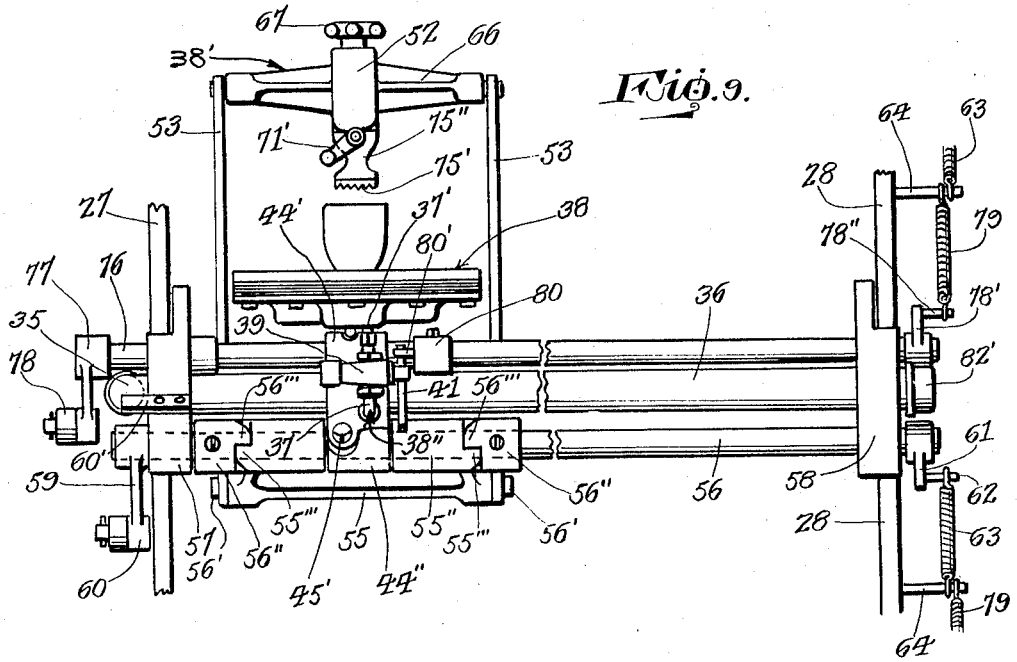
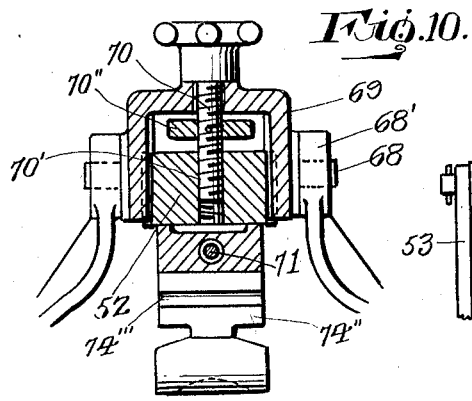
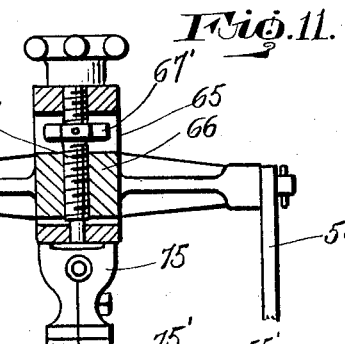
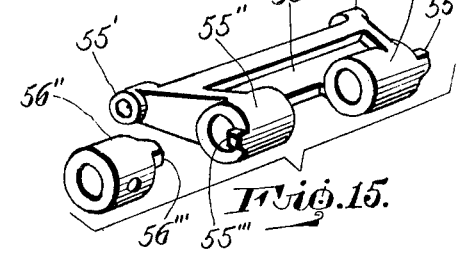
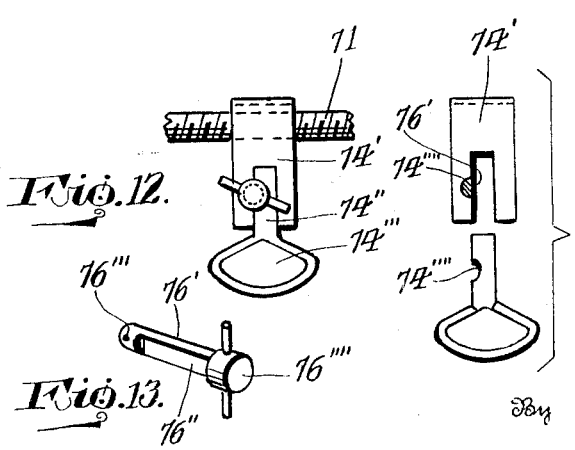
Inventor
George Laganas
By
Geo. P. Kimmel
Attorney

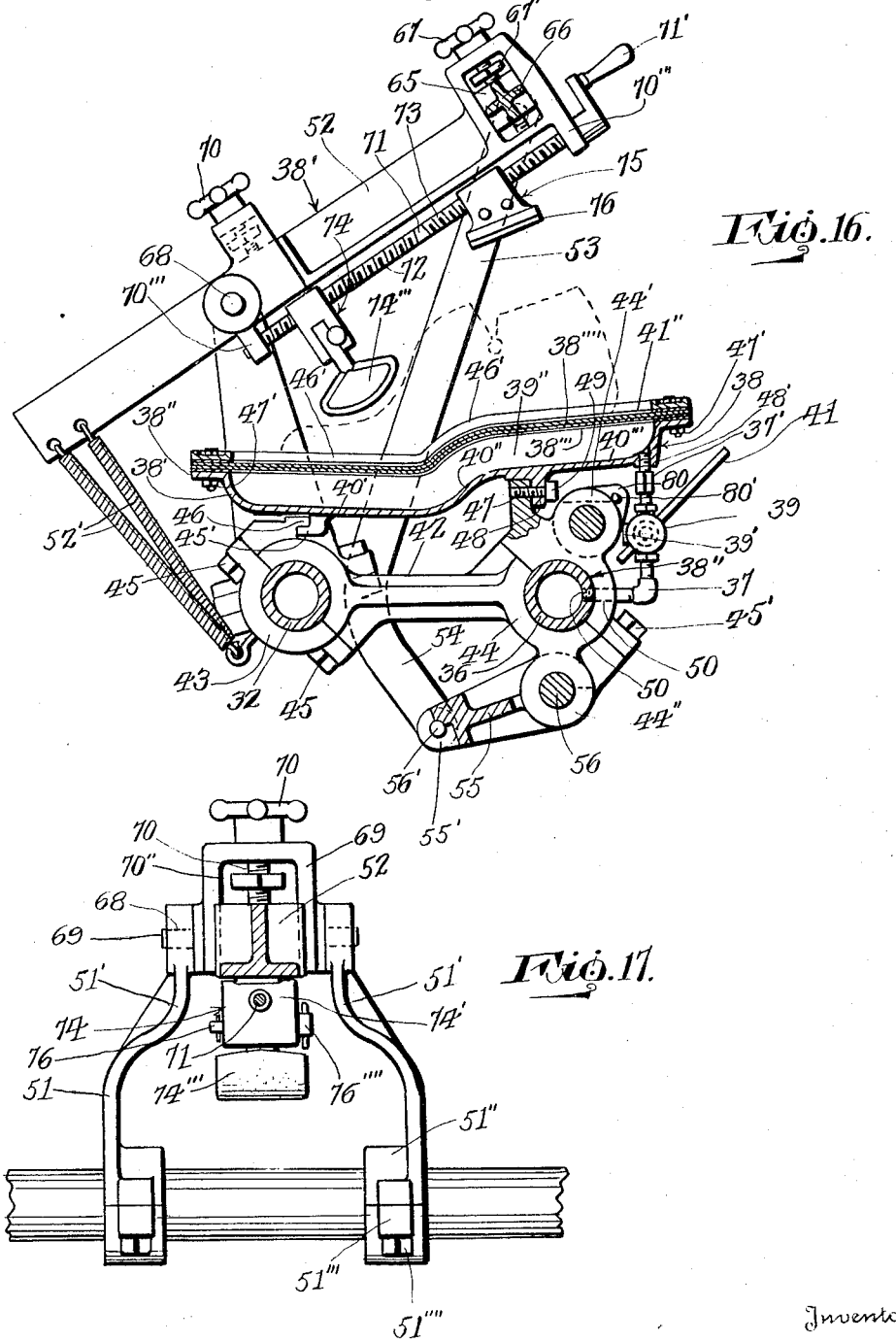

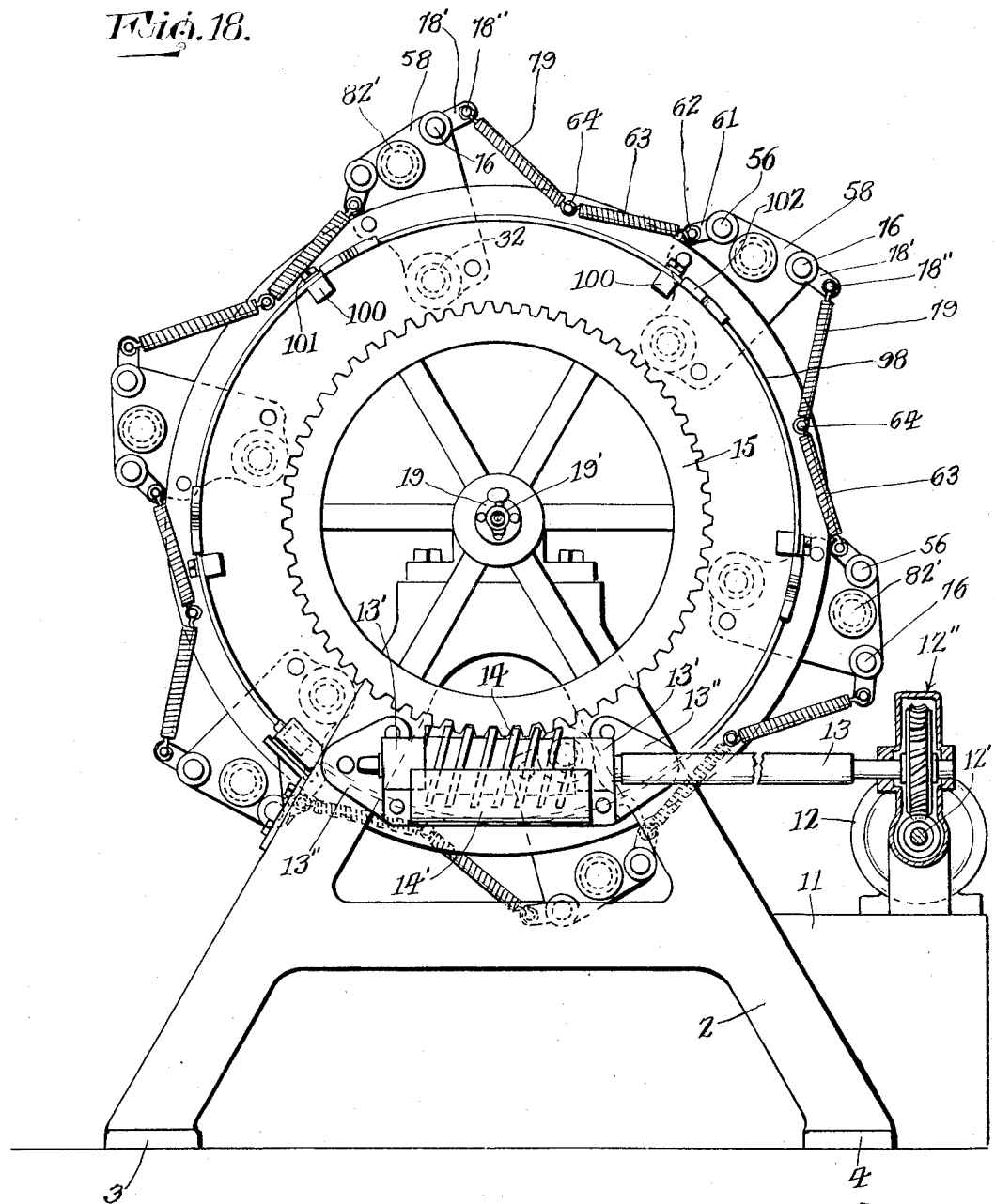

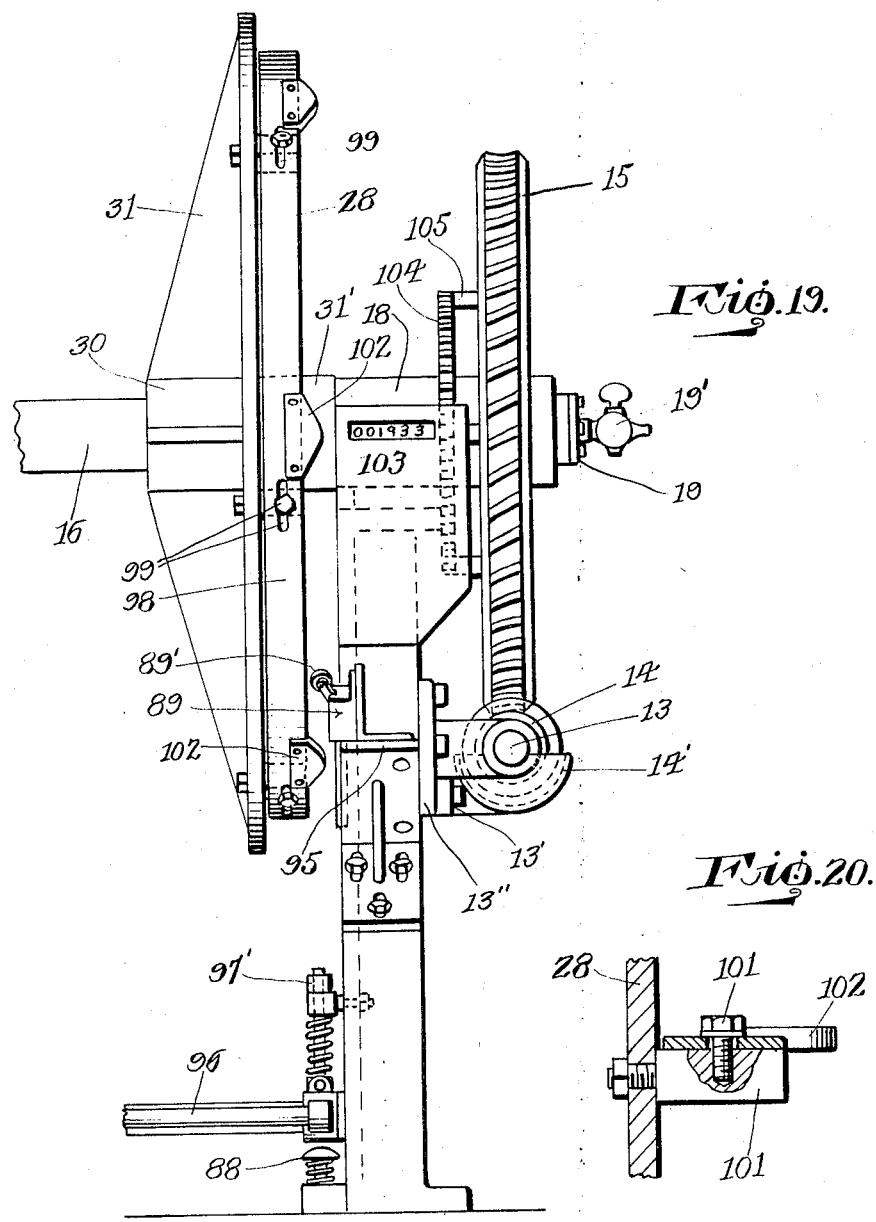

Dec. 19, 1933.    G. LAGANAS    1,940,597
SHOE SOLE LEVELING, SHAPING, AND SECURING MACHINE
Filed Sept. 21, 1932    9 Sheets-Sheet 9
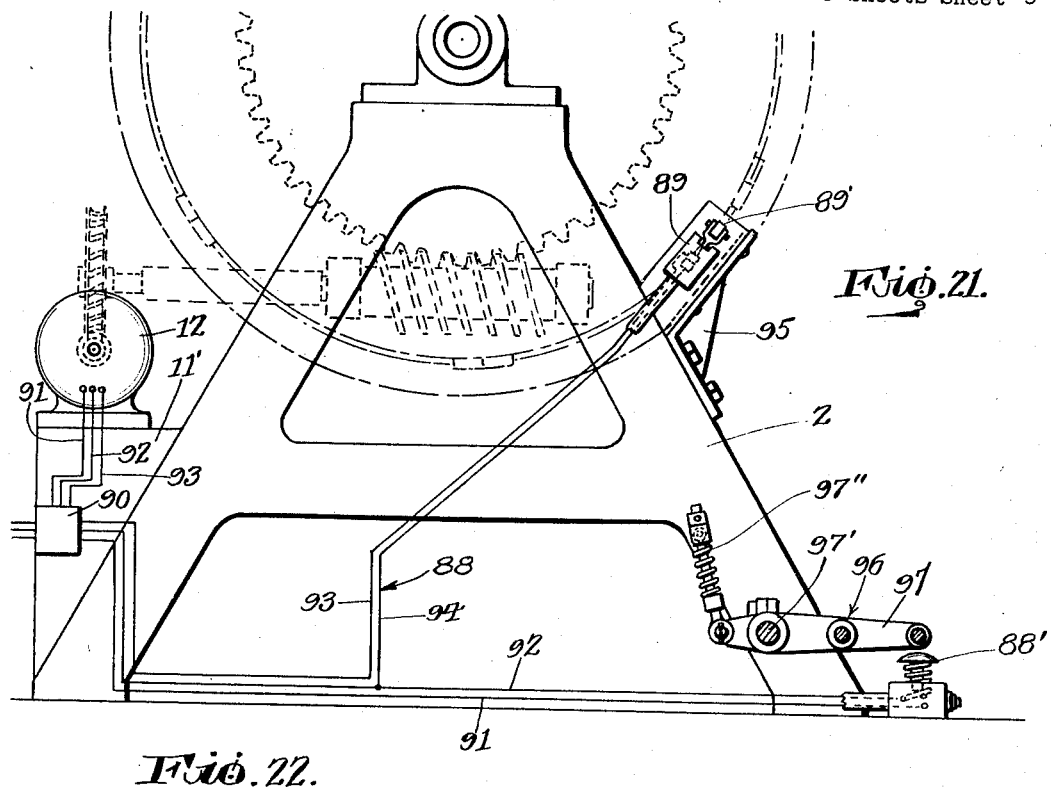
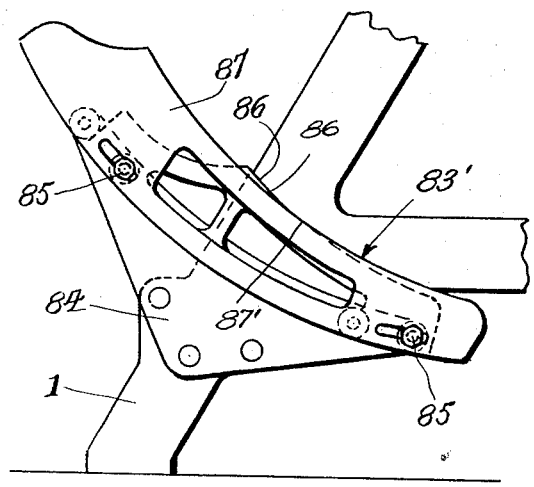
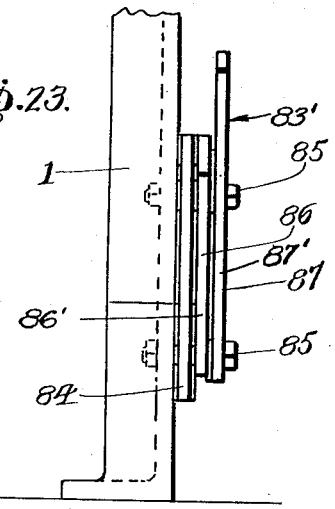
Inventor
George Laganas
By Geo. P. Kimmel
Attorney Patented Dec. 19, 1933

1,940,597

UNITED STATES PATENT OFFICE 1,940,597

SHOE SOLE LEVELING, SHAPING, AND SECURING MACHINE

George Laganas, Lowell, Mass.

Application September 21, 1932
Serial No. 634,249

38 Claims. (Cl. 12—37)

This invention relates to a leveling, shaping and securing machine for shoe soles, and has for its object to provide, in a manner as hereinafter set forth, a machine of the class referred to for expeditiously and simultaneously leveling, shaping and securing a shoe sole, carrying a cementitious material, to an upper positioned on a making last by the application to the sole for a substantial period of a continuous building up pressure derived from an open compressed air supply, thereby resulting in the sole being formed with a permanent bend and curve to conform to that of the last and for securing of the upper and sole in fixed relation with respect to each other.

Under the present system in shoe factories, the leveling is accomplished by a direct pressure machine, upon one shoe at a time and as fast as the operator can feed the machine. As the shoe sole is damp and the shoe remains in the machine only a second and is withdrawn still damp, it results that in drying, the sole loses slightly the shape into which it was placed by the machine. This objection is overcome by a machine in accordance with this invention, because when the shoe is removed at the end of the sole leveling, shaping and securing operation the sole is dry, will retain the shape imparted thereto and is fixedly secured to the upper on the making last.

A further object of the invention is to provide, in a manner as hereinafter set forth, a machine for the purpose set forth whereby the shaping, leveling and securing of the sole to the upper is carried out on the original making last, under such conditions providing for increased production and a material decrease in the cost of labor.

A further object of the invention is to provide, a machine of the class referred to including a revoluble carrier having mounted thereon spaced sets of compressed air operated sole leveling, shaping and securing elements bodily moving in a circular path with the carrier, and means for continuously supplying compressed air to the elements of each set from the point of starting of the set on its circular path to a point adjacent and in proximity to the point of termination of the path of travel.

A further object of the invention is to provide, a machine of the class referred to including a revoluble carrier having connected thereto for bodily moving therewith, in a circular path, a compressed air operated sole leveling, shaping and securing element and with said element having a continuous supply of compressed air thereto to cause said element to act upon the sole from the starting point of movement of said element for a distance of travel equalling from over 280 to under 360 degrees of the circular path in which such element travels.

A further object of the invention is to provide, a machine of the class referred to and in a manner as hereinafter set forth, with a series of spaced sets of compressed air operated sole leveling, shaping and securing elements. Each set travelling in a circular path and with the elements of the set having a continuous supply of compressed air thereto from the starting point of movement of the set for a distance from over 280 to under 360 degrees of the circular path in which the element travels, and with the machine further provided with spaced means associated with each set for causing exhaust of the compressed air simultaneously from all of the elements of the set after the latter travels a distance equaling from over 280 to under 360 degrees of the circular path in which the set travels.

A further object of the invention is to provide, a machine of the class referred to with a series of independent set of compressed air operated sole leveling, shaping and securing elements and a compressed air supply means common to said sets. Each set travelling in a circular path and with the elements of the set simultaneously receiving a continuous supply of compressed air during the major portion of the distance of the circular path in which the element travels. The machine being provided with means acting near the end of the travel of each set for simultaneously exhausting the compressed air from the elements of the set, and further with means for simultaneously exhausting the air from the elements of all of the sets when the sets are stationary or travelling in a circular path.

A further object of the invention is to provide, in a manner as hereinafter set forth, a revoluble carrier having mounted thereon and bodily movable therewith independent spaced sets of compressed air operated sole leveling, shaping and securing elements and means controlled from the carrier for successively and automatically stopping the carrier during the revolving of the latter.

A further object of the invention is to provide, in a manner as hereinafter set forth, a machine of the class referred to including an intermittently revoluble carrier including means for supporting spaced sets of compressed air operated leveling, shaping and securing elements for the soles, a compressed air supply structure common to the elements of each set and having as a part thereof a set of simultaneously opened and selectably closeable air pressure control valves corresponding in number to the elements of each set, a compressed air supply head common to said supply structure, and a source of compressed air supply opening into the said head.

A further object of the invention is to provide, a machine of the class referred to with a revoluble carrier and means bodily moving with the carrier and providing combined work leveling, shaping and sole securing elements and a work clamping device associated with each of said elements, and means spaced from and dependent upon the movement of the carrier for successively making inactive each combined sole leveling, shaping and securing element and the work clamping device associated with the latter on near the completion of a circular path in which the element is moved by the carrier.

A further object of the invention is to provide, in a manner as hereinafter set forth, a sole leveling, shaping and securing machine which can be employed for all kinds of shoes, such as McKays, welts, etc., for leveling, shaping and securing soles with the required bend to uppers on the original making last.

A further object of the invention is to provide, in a manner as hereinafter set forth, a machine for the purpose set forth whereby the shaping, leveling and securing of the sole is carried out on the original making last, under such conditions providing for increased production and a material decrease in the cost of labor.

A further object of the invention is to provide a machine of the class referred to and in a manner as hereinafter set forth, whereby it does not necessitate in its use, to accomplish a sole shaping, leveling and securing operation the employment of separate iron beating out forms of lasts, as is the case at present, more especially the employment of different shapes of forms or lasts for different styles and sizes of shoes.

Further objects of the invention are to provide, in a manner as hereinafter set forth, a machine for the purpose referred to which is comparatively simple in its construction and arrangement, strong, durable, compact, thoroughly efficient in its use, automatic in its action for relieving a continuous supply to air pressure functioning to level the sole, automatic in its action for elevating the last holder, readily assembled and comparatively inexpensive to manufacture.

To the above ends essentially and to others which may hereinafter appear, the invention consists of such parts, and such combination of parts which fall within the scope of the invention as claimed.

In the drawings:

Figure 3 is a detail in side elevation of the work clamp and the sole leveling, shaping and securing element associated with the clamp.

Figure 4 is a detail in top plan of the compressed air operated work or sole leveling, shaping and securing element.

Figure 5 is a fragmentary view in longitudinal section of the machine at the compressed air intake end thereof.

Figure 6 is a fragmentary view in elevation illustrating one end of the means for making the work clamping mechanism and work or sole leveling, shaping and securing mechanism inactive.

Figure 7 is a detail in section illustrating one of the compressed air controlling valves.

Figure 8 is a detail of the work clamp.

Figure 9 is a fragmentary view in front elevation illustrating the means for making the work clamping mechanism and work or sole leveling, shaping and securing mechanism inactive.

Figure 10 is a fragmentary view in transverse section of the work clamping mechanism.

Figure 11 is a fragmentary view in vertical section of the work clamping mechanism.

Figure 12 is a detail in side elevation illustrating the removable work abutment member of the work clamping mechanism.

Figure 13 is a perspective view of the latching means for the removable work abutment member.

Figure 14 is a detail in side elevation showing the removable work abutment member disassembled.

Figure 15 is a disassembled view in perspective view showing the trip collar for releasing the work clamping mechanism.

Figure 16 is a sectional elevation illustrating in inoperative position the work clamping mechanism and its associated sole leveling, shaping and securing mechanism.

Figure 17 is a vertical sectional view of the work clamping mechanism.

Figure 18 is an elevation looking towards the other end of the machine.

Figure 19 is a fragmentary view in front elevation showing the operating means for the machine, the means for controlling the revolving of the carrier and the work registering device.

Figure 20 is a detail in section of the means for controlling the operation of the carrier.

Figure 21 is an elevation of the circuit arrangement for the driving motor of the machine.

Figure 22 is a fragmentary view in elevation looking towards the cam mechanism which coacts with and is common to the releasing means for the work holding and sole leveling, shaping and securing elements.

Figure 23 is a front elevation of the cam mechanism shown in Figure 22.

Figure 1:
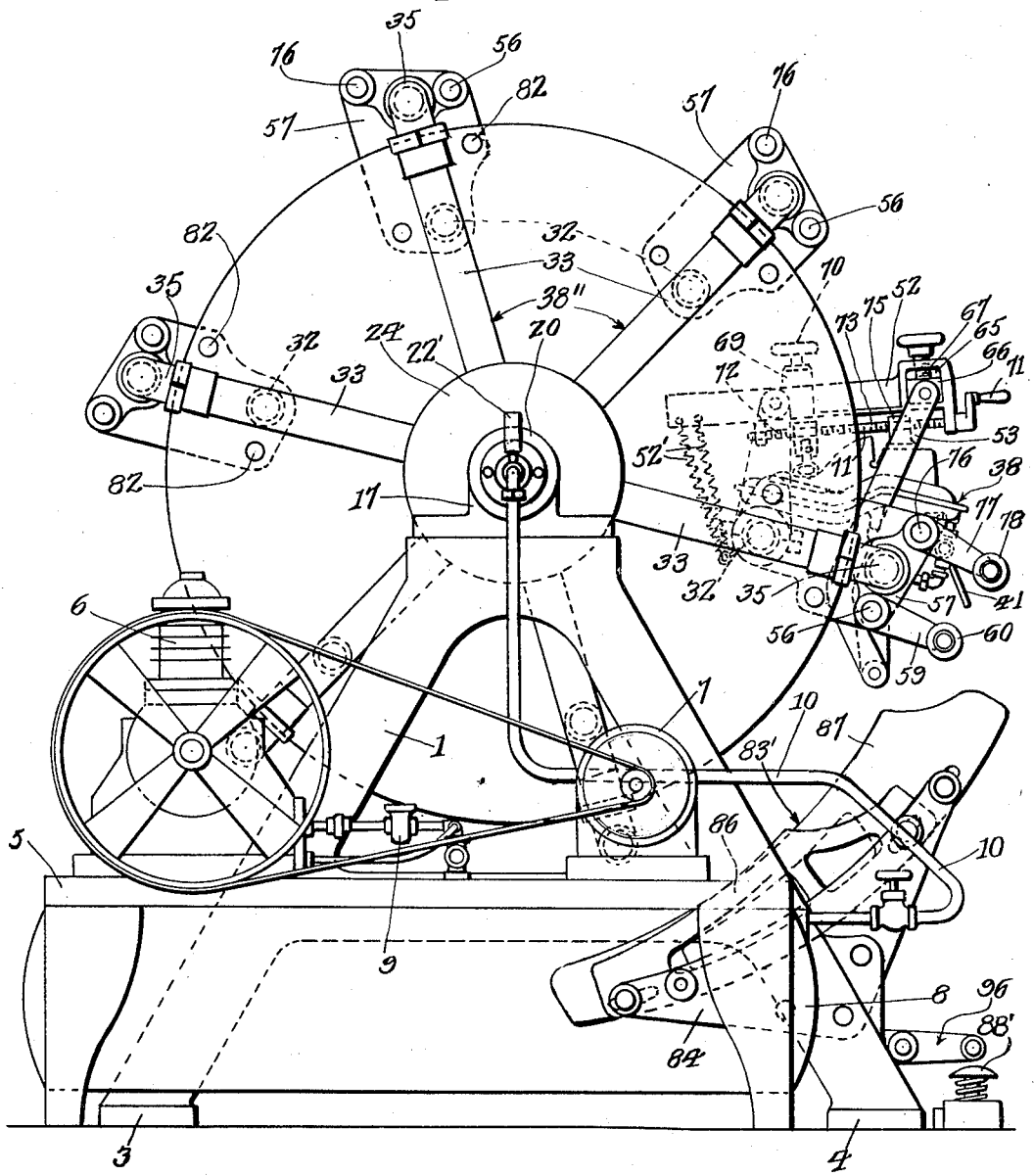
Figure 1 is an elevation looking towards one end of the machine.

The machine will include a plurality of independent sets of sole leveling, shaping and securing elements and a work clamping, holding or retaining mechanism associated with each element of a set. Each set may be formed of any desired number of elements. The drawings show but a portion of but one set of sole leveling, shaping and securing elements and their associated work clamping mechanisms. It is to be understood that each set of sole leveling, shaping and securing elements will be set up and arranged in a manner as referred to with respect to the set which will be hereinafter described. The sets are supported on and bodily movable in unison with a revoluble carrier. Each set travels in a circular path and each element of a set is open to a compressed air supply from its start of travel in such path for a distance equaling approximately between 280 and under 360 degrees of the path whereby during such extent of travel of an element, a continuous supply of compressed air is employed for the carrying out of the leveling, shaping and securing of the sole to the upper while the latter is on the working last.

Referring to the drawings in detail, 1 and 2 denote a pair of parallel, spaced A-shaped supporting frames (Figures 1, 2 and 18) of the desired height and each outwardly flanged at its bottom as at 3, 4. A support 5 is shown for an air compressor 6, a driving motor 7 operatively connected to the latter and a compressed air tank 8. The support 5 may be arranged at any suitable point and by way of example is positioned adjacent frame 1. Leading from compressor 6 and opening into tank 8 is a valve controlled discharge pipe 9. Extended from one end of tank 8 is a valve controlled normally open compressed air supply line 10 having an elbow 11 at its upper or outer end. It is to be understood that any suitable arrangement or means can be employed for continuously supplying compressed air to line 10.

Arranged at the rear of frame 2 is a support 11' (Figure 21) carrying an electric motor 12 which is employed for driving the machine. The shaft 12' (Figure 18) of motor 12 operates a reduction gearing 12" of the worm type which drives a power transmitting shaft 13 carrying a worm 14 for revolving a worm gear 15 (Figures 1, 18 and 19) fixed to the operating shaft 16 of the machine. The shaft 13 is mounted in spaced bearings 13' carried by brackets 13" secured to the outer face of frame 2. Secured to and arranged between bearings 13' is an oil or lubricant container 14' through which revolves the worm 14.

The ends of shaft 16 are arranged in bearings 17, 18 (Figure 2) which are secured to the tops of the frames 1, 2 respectively. The shaft 16 is tubular and that end mounted in bearing 18 is closed by a plug 19 provided with a compressed air exhaust cock 19'. The other end of shaft 16 is positioned inwardly of the outer end of bearing 17. Extending into the outer end of the latter and opposing shaft 16 is a packing structure 20 carrying a compressed air supply nozzle 21 which opens at its inner end into shaft 16 and has its outer end coupled, as at 22 to the elbow 11. A pressure gauge 22' is attached to elbow 11.

Adjacent the inner end of the bearing 17 the shaft 16 is formed with a circumferentially set of radially disposed compressed air outlets 23. Fixedly secured to shaft 16 adjacent the inner end of bearing 17 is a head 24 for the reception of compressed air from outlets 23. The head has a series of spaced outlets as at 26.

Figure 2:
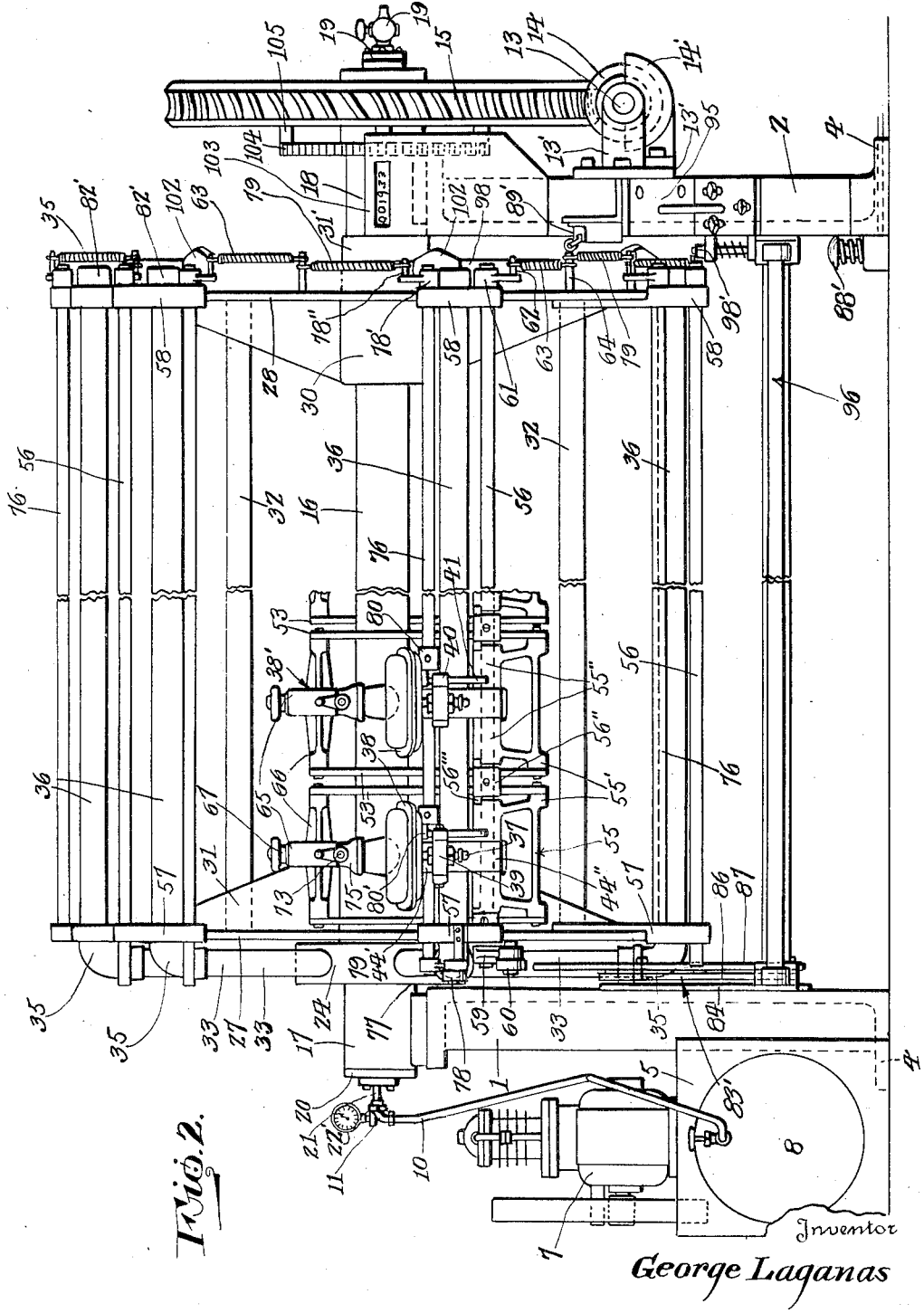
Figure 2 is a front elevation broken away.

Bodily movable with shaft 16 is a carrier formed of a pair of spaced, opposed, parallel circular discs 27, 28 (Figures 1, 2 and 5). Each disc has an axial opening 29, an inwardly extending hub 30 and reinforcing webs 31 on its inner face. The hubs 30 are suitably fixed on shaft 16. The disc 27 has an annular boss 31 on its outer face which abuts the head 24. The disc 28 has a collar 31' on its outer face opposing bearing 18. The discs 27, 28 are connected together by a set of spaced combined tie and supporting bars 32 having their ends fixedly anchored to the discs. The bars 32 are arranged in proximity to the outer edges of the discs.

The machine includes sets of work clamps or mechanisms 38 and sets of compressed air operated work or sole leveling, shaping and securing elements or mechanisms. The number of bars 32 will correspond to the number of sets of work clamps 38'. The number of sets of combined sole leveling, shaping and securing elements will correspond to the number of sets of work clamps. The number of work clamps of each set will correspond to the number of combined sole leveling, shaping and securing elements of a set. A work clamp is suspended over a combined sole leveling, shaping and securing element. A controllable compressed air supply structure 38" is associated with each set of combined sole leveling, shaping and securing elements, and an automatically operated releasing means is associated with each set of work clamps and each set of leveling, shaping and securing elements.

Each controllable compressed air supply structure 38" (Figures 1, 2, 5, 6 and 7) includes a pipe branch 33 opposing the outer face of the disc 27 and connected to the head 24. Each branch 33 communicates with an outlet 26. Attached to the outer end of each pipe branch is an elbow 35 which projects beyond the outer edge of the disc 27 and extends inwardly from the latter. Extending from each elbow 35 is a compressed air conducting pipe 36 having communicating therewith the inwardly extending inner ends of a series of spaced compressed air feed pipes 37 corresponding in number to that of the number of combined sole leveling, shaping and securing elements 38 of a set. Each pipe 37 at its outer end opens into the bottom of a valve 39 for controlling intake and exhaust of compressed air to and from an element 38. Extending from each controlling valve 39 to each element 38 is a combined intake and exhaust pipe 37'. The valve 39 has an exhaust 39' which opens into the atmosphere. Attached intermediate its ends to the stem 40 of valve 39 is a stem shifting handle 41, the latter being operated automatically in a manner as hereinafter referred to to cause the exhaust of air pressure from element 38. The handle 41 is manually operated to open valve 39 to pipe 37 to provide for a continuous supply of compressed air to element 38 while the latter is in active position.

Each bar 32 associates with a pipe 36 for supporting a series of spaced coupling brackets 42 corresponding in number to the number of elements 38 of a set. Each bracket 42 has an annular inner end 43 formed of a pair of abutting sections and an annular outer end 44 formed of a pair of abutting sections. The sections of end 43 are removably secured together and to the bar 32 by the holdfast means 45. The sections of end 44 are detachably connected together and to the pipe 36 by the holdfast means 45'. The element 38 has a depending angle shaped lug 45" which interengages with an angle shaped extension 46 on the inner end of bracket 42 (Figures 3 and 16). The outer end 44 of bracket 42 has a vertical protuberance 47 which supports element 38 and is fixedly secured, as at 48 to a depending lug 49 on the bottom of element 38. The arrangement referred to provides for supporting and removably coupling element 38 to bracket 42 and for detachably connecting bracket 42 to a rod 32 and a pipe 36. The end 44 of the bracket 42 has an opening 50 registering with an opening 50' in pipe 36 and in said registering openings is secured the inner end of the inwardly extending angular portion of a pipe 37. The top and bottom of the outer end 44 of each bracket 42 is formed with bearings 44', 44" respectively, the latter being arranged inwardly with respect to the former. The purpose of the bearings 44', 44" will be presently referred to.

Each element 38 (Figures 3, 4 and 16) includes a cup shaped metallic base or plate 38' having an outwardly extending flat endless flange 38" at its top. The base 38' is of oval contour in plan and in side elevation is of a contour to conform to the bend required in the shoe sole. Seated on the flange 38" and coextensive therewith is one or more washers 38'" corresponding in contour to that of the flange. Seated upon the washer or washers 38'" is a compressed air operated pressure applying members 38"" for the sole of the shoe. The said member is formed of one or more flexible or resilient plies of material suitable for the purpose intended, of the same oval contour as that of the base 38'. The member 38''''' forms in connection with the base a compressed air receiving chamber 39''. When leveling, shaping and securing the sole to the upper the sole is seated on member 38''''. The base 38' includes a lower part 40', an intermediate curved part 40'' and an upper part 40''' and by this arrangement part 40''' is offset with respect to part 40'. Seated upon the marginal portion of the upper face of member 38'''' is a washer 41'' corresponding in contour to that of washer 38'''. Seated upon washer 41'' is an endless metallic band 46' corresponding in contour to that of washer 41''. The band, washers, flexible member and flange are secured together by spaced holdfast means 47'. The flexible member is of materially greater width and length than that of the last which carries the upper. The base 38' near one end is formed with an opening 48', in which the pipe 37' is secured.

Each work clamp holder, retainer or mechanism 38' (Figures 3, 16 and 17) includes a pair of supporting arms 51 having inset outer portions 51', a spring controlled hanger member 52 having depending from its outer end a pair of angle shaped latching links 53 formed with outwardly directed inner portions 54, attached to the lower end of a lever member 55, loosely mounted on and adapted to be coupled to a spring controlled rock shaft 56 (Figures 1, 2 and 9) journaled in a pair of holders 57, 58 fixed to the inner face of and extended from the outer edge of discs 27, 28 respectively. The links 53 function when off center with respect to shaft 56 for locking the work clamp in work clamping position. The lever member 55 coacts with the links 53 for maintaining them in locking position. When lever member 55 is coupled to shaft 56, when the latter is rocked it moves in a direction to shift links 53 from locking position and throws hanger 52 upwardly from its outer end. One end of shaft 56 carries a trip arm 59 provided with a roller 60. The holder 57 carries a stop 60' for limiting the return movement of arm 59. The other end of shaft 56 has attached thereto a crank arm 61 provided with a pin 62 to which one end of a controlling spring 63 is connected. The other end of spring 63 is anchored to a pin 64 carried by disc 28. The outer end of member 52 is formed with an opening 65 in which is arranged a horizontally disposed vertical cross bar 66 to which the upper ends of links 53 are pivotally attached. An adjustable means, as at 67 is carried by member 53 and is provided for adjusting and holding bar 66 in set position. The member 52 (Figures 3 and 16) has connected to its inner end the outer ends of a pair of controlling springs 52'. The inner ends of springs 52' are anchored to the inner end 43 of bracket 42. The shaft 56 extends through bearing 44''. The means 67 is rotatably connected to member 52 and includes a lock nut 67'. The adjusting means 67 threadedly engages with bar 66.

An inverted yoke 69 (Figures 3, 8, 16 and 17) straddles hanger 52 at a point between the transverse median and inner end of the latter. An adjusting screw 70 is carried by yoke 69 and has threaded engagement with hanger 52, as at 70'. A lock nut 70'' for maintaining screw 70 in set position is interposed between the top of the yoke and hanger. The screw 70 functions to adjust hanger 52 relative to yoke 69 and for controlling the upward movement and angular disposition of hanger 52 relative to arms 51. The yoke 69 has the lower portions of its sides offset and provided with pivots 68 extending into the upper ends of arms 51 as at 68'.

The lever member 55 (Figure 15) includes a pair of spaced parallel collars 55' at its inner end and a pair of spaced parallel sleeves 55'' at its outer end. The outer ends of sleeves 55'' are formed with lateral lugs 55'''. The purpose of the lugs will be presently referred to.

The lower ends of links 53 are pivotally connected to the collars 55', as at 56'. The sleeves 55'' are loosely mounted on shaft 56. Fixed to the latter are pairs of spaced collars 56'', each pair associated with and oppose lugged ends of the sleeves 55'' of a lever member 55. Each collar 56'' has a lug 56''' at one end. The lugs 55''' are arranged in the path of the lugs 56''' whereby when shaft 56 is rocked in a direction against the action of its controlling spring lugs 56''' will engage lugs 55''' and carrying sleeves 55'' therewith whereby the lever 55 will be shifted in a direction to release the links 53 and elevate hanger 52.

The lower ends of arms 51 (Figure 17) are of annular form as at 51'' and split as at 51'''. The arms 51 are secured to bar 32. The splits in the lower ends of arms 51 are secured together by the holdfast means 51''''. The lower ends of the arms 51 have arranged therebetween the inner end of a bracket 42.

The member 52 (Figures 3 and 16) at its front and between arms 51 has depending extensions 70''' in which is arranged a rotatable rod 71, formed with sets of oppositely disposed threads 72, 73 for adjusting relatively to each other, a pair of clamps or abutments 74, 75, the former for bearing against the front of the upper 74' on the last 53. The clamp or abutment 75 (Fig. 11) bears against the top of the rear end of last 53, has a serrated working surface 75' and includes a shank 75'' through which extends rod 71, the threads 73 on the latter engaging with shank 75''. The rod 71 has its outer end provided with a handle 71'.

The clamp or abutment 74 (Figures 12, 13 and 14) includes a bifurcated holder 74' into which extends the shank 74'' of a clamping or abutment head 74''' of cushioning material. The head 74''' is of substantially oval contour in vertical lengthwise section. The holder 74' and shank 74'' have transverse grooves 74'''' which are adapted to register with each other and when in registration provide a circular opening for the passage of a rotatable latching member 76' to detachably couple the holder and shank together. The member 76' has a flattened surface 76'' which when it opposes either groove 74'''' the shank can be removed from the holder. The member 76' is of greater length than the width and extends from each side of the holder. One end of member 76' carries a retaining pin 76''' and its other end is enlarged and provided with a handle piece, as at 76''''.

Carried by each pair of holders 57, 58 and spaced from shaft 56 is a spring controlled rock shaft 76 (Figures 1, 2 and 9) of greater length than shaft 56. Secured to one end of shaft 76, outwardly with respect to trip arm 59 is a trip arm 77 provided with a roller 78. The other end of shaft 76 carries a crank arm 78' provided with a pin 78'' having attached thereto one end of the controlling spring 79 for the shaft 76. The other end of spring 79 is attached to a pin 64. Each shaft 76 has a series of spaced collars 80 fixed thereto. The number of collars on each shaft 76 corresponds to that of the number of valves 39 of each supply valve structure 38″. Each collar 80 has a pin 80′ functioning to operate a handle 41 in a direction to open a valve 39 to the atmosphere for the purpose of exhausting pressure from that element 38 which is associated with such valve 39. The valves 39 of a set are simultaneously shifted to communicate with the atmosphere on the rocking of a shaft 76 from normal position, and the manner in which it is accomplished will be presently referred to. The handles 41 are selectively operated to open each valve 39 of a set to establish communication between a compressed air supply and an element 38.

The holders 57, 58 have enlarged bosses 81, 81′ which abut the inner faces of the discs 27, 28. Holdfast means 82 are employed for securing holders 57, 58 to discs 27, 28. Each pipe 36 extends through a pair of holders 57, 58. That end of pipe 36 opposite the end attached to elbow 35 is capped as at 82′. The shaft 76 extends outwardly a greater distance from holder 57 than shaft 56.

Associated with the trip arm 59, 77 for the purpose of rocking the shafts 56 and 76 is a cam mechanism 83′ (Figures 1, 2, 22 and 23) carried by and extended from the frame 1 and arranged in the path of travel of the rollers 60 and 78. The arms 77 are actuated in advance of the arms 59. The cam mechanism includes a support 84 which is anchored against the inner side of frame 1 at the bottom of the latter and extends outwardly therefrom. Connected to support 84 in sidewise opposed relation is a cam plate 86 for actuating arms 77 and a cam plate 87 for actuating arms 59. The plate 86 opposes support 84 and plate 87 opposes plate 86. The plates 86, 87 are substantially of segmental contour.

The plates 86 and 87 are adjustably connected to the support 84 by pin and slot connections 85. The plates can be adjusted in unison or independently with respect to each other. The plates 87, 86 have curved working surfaces 87′, 86′ respectively against which travel the rollers 78, 60 respectively for the purpose of rocking shafts 76, 56 respectively against the action of their controlling springs. The arrangement and construction of the cam plates 86, 87 are such that the shaft 76 will be rocked to open the elements 38 to the atmosphere in advance of the rocking of shaft 56 to open the work clamps. The cam plates are adjustable with respect to the support 84 to vary the duration of the period between the actuation of a shaft 76 and the actuation of a shaft 56. The shafts 76 are successively operated at brief intervals. The shafts 56 are successively operated at brief intervals but alternately with respect to shafts 76. Immediately after the passage of the rollers 78, 60 from off the working surfaces 86′, 87′ respectively the shafts 76, 56 respectively are returned to their normal position by their controlling springs. Each shaft 76 is rocked to position to provide for the exhausting of the compressed air from that set of elements 38 associated therewith when such set has travelled a distance equaling approximately 280 degrees of a circle. The compressed air supply to the set remains closed to the latter until it is opened by an attendant for the machine. Each shaft 56 is rocked to release the work clamps of a set when such set has travelled a distance equaling approximately 280 degrees of a circle. The work clamps of a set remain in open position until they are manually closed by the attendant. The elements 38 of a set are selectively locked by the attendant, the operation being such that a work clamp is manually arranged in locking position, after which that element 38 associated with such clamp is opened to the compressed air supply.

The carrier for the sets of elements is intermittently revolved. The period of stoppage is employed for placing the sole, upper and working last on each element 38 of a set, arranging all of the work clamps of such set in locking position, then opening all of the elements 38 of the set to the compressed air supply and then starting the carrier. The carrier after moving a short distance in the direction of a circle is automatically stopped. If six sets of elements 38 are employed then the carrier will have six impulses imparted thereto for one complete revolution thereof. The number of impulses required for one complete revolution of the carrier will depend upon the number of sets of elements 38 mounted on the carrier.

The revolving movement of the carrier is controlled by a combined manually and automatically operable controlling mechanism 88 (Figures 19 and 21), started manually and stopped automatically. The said mechanism includes a manually operated spring controlled switch 88′ and an automatically operable cutout 89. The switch and cutout are interposed in the power circuit for the driving motor 12. A fuse box is indicated at 90 and the fuse, not shown, is interposed in the line connections 91, 92, 93 which extend to the motor 12. The connections 91, 92 lead to the switch 88′, the connection 93 to the cutout 89 and a branch connection 94 from connection 92 to cutout 89. The latter is mounted on a bracket 95 carried on the front of frame 2 below the top of the latter.

The switch is operated manually by a spring controlled foot treadle 96 (Figures 1, 2, 19 and 21), having its ends 97 eccentrically mounted on pivots 97′ extending towards each other from the lower portions of the inner face of the front parts of frames 1 and 2. At the rear of one end of treadle 96, the latter is pivotally connected to a spring controlled, slidable movable hanger 97″ supported from the inner faces of the frame 2. The front of treadle 96, at one end thereof is arranged normally in superposed spaced relation with respect to the spring controlled switch 88′ whereby when the front of treadle 96 is depressed manually the switch 88′ will also be depressed for closing the power circuit for the motor. The treadle 96 is normally maintained in spaced relation with respect to the switch 88 by the hanger 97″. The cutout 89 is normally in circuit closing position. When switch 88′ is closed the motor 12 will be operated whereby the carrier moves in a circular path until the cutout is shifted to open position, which shift is had from the carrier, the motor then ceases to operate resulting in the stoppage of the carrier. An impulse is given to the carrier upon the successive closing of the switch. The cutout 89 includes a pivoted, counter-balanced circuit opening and closing arm 89′.

Adjustably secured against the outer face of disc 28 and of less diameter than the diameter of the latter is a band 98 which is circumferentially slotted at spaced points as at 99. The number of slots depending upon the number of sets of elements 38. The slots are spaced equi-distant with respect to each other. The band 98 is arranged against a circular row of posts 100 and extending through the slots 99 and engaging in the posts 100 are binding screws 101 to maintain the band in set position. Secured to band 98, extending towards worm wheel 15 and arranged equi-distant apart are tapered trip members 102 which successively act upon cutout 89 to open the same whereby the revolving movement of the carrier will be stopped, due to the fact that the power circuit to the motor 12 will be opened. The number of trip members correspond to the number of sets of elements 38. The band is adjusted for the purpose of stopping the carrier, to regulate the position of that set of elements 38 from which the air has been exhausted, to enable the operator to have convenient access thereto for removing completed work and the positioning of work to be completed.

Secured to the frame 2 is a register 103 for the number of shoes completed. The register may be of the type including a gear train for operating it and with one of the gears of the train actuated from a ring gear 104 secured by the coupling posts 105 to the spokes 106 of the worm gear 15. As the latter revolves the ring gear 104 will be carried therewith providing for the actuation of the gear train to operate register 103.

One of the advantages of the machine is the continuous supply of compressed air to chamber 39″ until the element 38, of which such chamber forms a part, travels a distance equaling approximately 280 degrees or more of a circle, thus if a small leak should happen in member 38″″, the pressure of air would still maintain such member extended, that is to say it would not fall, under such conditions the sole leveling, shaping and securing action would be carried on until the air is exhausted from all of the elements 38 of the set. A further advantage is that a continuous pressure of compressed air is had on member 38″″ for action on the sole from the time the work clamped has travelled a distance equaling approximately 280 degrees or more. Or in other words, the compressed air is continuously supplied from the start of the sole leveling, shaping and securing operation to the completion thereof whereby the members 38″″ are held, by a continuous supply of compressed air in active position until a completion of the work.

The cock 19′ not only provides for exhausting the compressed air simultaneously from all of the elements 38, but permits of the latter and shaft 16 being blown out to remove foreign substances when occasion so requires.

What I claim is:—

1. In a sole leveling, shaping and securing machine, an intermittently revoluble carrier, spaced independent sets of compressed air operated sole leveling, shaping and securing elements adapted to have the work detachably clamped thereon, said elements secured to and bodily movable with the carrier in a circular path, shiftable means for maintaining a continuous supply of compressed air simultaneously to the elements of each set from the start of movement of the set in its path of travel for a distance greater than half of and less than the distance of the complete path in which the set travels, a spring controlled rockable structure for actuating the said shiftable means of each set, the said structures being journaled in and bodily movable with the carrier in a circular path, and means arranged in the path of and common to the rockable structures for successively rocking the latter to provide for the operation of the shiftable means of a set to an extent sufficient for simultaneously closing successively the elements of a set to the compressed air supply and then for simultaneously opening the elements of the set to the atmosphere at a point between half and less than the complete path of travel of the set.

2. In a sole leveling, shaping and securing machine, a revoluble carrier, spaced independent sets of compressed air operated sole leveling, shaping and securing elements secured to and bodily movable with the carrier in a circular path, each of said elements of each of the sets adapted to have the work mounted thereon, a releasable work clamp coacting with each element, separate shiftable means for opening each of the elements of each of the sets to a continuous supply of compressed air at the start of movement of each set in its path of travel, means depending upon the movement of the carrier for actuating the separate shiftable means of each set to an extent sufficient for simultaneously cutting off the compressed air to and simultaneously opening all of the elements of the set to the atmosphere when the set travels a distance greater than half of and less than the distance of the complete path in which it moves, means depending upon the movement of the carrier for simultaneously releasing the work clamps of a set subsequent to the opening of the elements of the set to the atmosphere and before the set completes its path of travel, a combined electromechanical mechanism for intermittently operating said carrier, and means mounted on the carrier for controlling the operation of the latter from the said electro-mechanical mechanism.

3. In a sole leveling, shaping and securing machine, a circular row of spaced, independent compressed air operated sets of independent sole leveling, shaping and securing elements, each of said elements adapted to have the work mounted thereon, a continuous compressed air supply common to the elements of said sets, a valve structure for each of said elements, said valve structures interposed in said compressed air supply for opening and closing said elements to and from said supply and for simultaneously opening the elements to the atmosphere when the elements are closed to said supply, a revoluble carrier supporting said row and structures providing for each set travelling in a circular path, supporting means for the carrier, a releasable separate work clamp coacting with each element of a set, said carrier supporting said work clamps, independent means for actuating simultaneously the valve structures of each set to an extent sufficient to simultaneously close the elements of the set to said supply means and then for simultaneously opening the elements of a set to the atmosphere, an independent releaser for simultaneously releasing the work clamps of each set subsequent to the closing of the elements of such set to said supply means, the said independent means and releasers being bodily movable with the carrier, a cam mechanism common to and arranged in the path of said independent means and releasers for operating them when said sets travel a distance greater than half and less than the distance of the complete path in which the sets move, an electro-mechanical mechanism for intermittently revolving the carrier, and means mounted on the carrier for controlling the operation of the latter from the said electro-mechanical mechanism.

4. In a sole leveling shaping and securing machine, independent sets of compressed air operated, sole leveling, shaping and securing structures, each structure of each set including means for releasably clamping the work thereon, each set travelling in a circular path, a revoluble carrier supporting said sets, a plurality of independent means on the carrier and each associated with a structure of a set for opening the structure on the start of movement of the latter in its circular path to a continuous supply of compressed air and for maintaining said supply open to the structure from the start of the travel of the latter in its circular path a distance greater than half of and less than the distance of the complete path in which it travels, each of said means including a shiftable element, means depending upon the movement of the carrier for simultaneously actuating the shifting elements of each set to an extent when the latter travels in its path a distance greater than half of and less than the complete distance of the path sufficient for simultaneously cutting off said supply to and then for simultaneously opening the structures of each set to the atmosphere and for simultaneously releasing the clamping means of each set subsequent to the closing of air supply to the structures of the set, an electro-mechanical mechanism for intermittently revolving the carrier, and means mounted on the carrier for controlling the operation of the latter from the said electro-mechanical mechanism.

5. In a sole leveling, shaping and securing machine, a plurality of structures arranged one in advance of the other and in a circular row, each of said structures travelling in a circular path, and including a compressed air operated member for action directly upon the sole, actuable means for maintaining a continuous supply of compressed air directly against said members for a period covering the distance of travel of each structure for more than half of and less than the complete distance of the path in which the structure travels, a carrier common to said structures for moving them in a circular path, means for actuating said maintaining means to an extent sufficient for cutting off said supply and then for opening each structure to the atmosphere at the end of such period, an automatically controlled electro-mechanical mechanism for intermittently revolving the carrier, and means mounted on the carrier for controlling the operation of the latter from the said electro-mechanical mechanism.

6. In a sole leveling, shaping and securing machine, a plurality of structures arranged one in advance of the other and in a circular row, each of said structures travelling in a circular path, and including a compressed air operated member for action directly upon the sole, actuable means for maintaining a continuous supply of compressed air directly against said members for a period covering the distance of travel of each structure for more than half of and less than the complete distance of the path in which the structure travels, a carrier common to said structures for moving them in a circular path, each of said structures including means for releasably clamping the work against that member forming a part thereof, means for actuating said maintaining means to an extent sufficient for cutting off said supply and then for opening each structure to the atmosphere at the end of said period, means for releasing said clamping means of each structure subsequent to the cutting off said supply to the latter and prior to the structure completing its path of travel, an automatically controlled electro-mechanical mechanism for intermittently revolving the carrier, and means mounted on the carrier for controlling the operation of the latter from the said electro-mechanical mechanism.

7. In a sole leveling, shaping and securing machine, a revolving carrier, spaced independent sets of compressed air operated sole leveling, shaping and securing elements bodily moving with the carrier in a circular path, each of said elements of each of the sets adapted to have the work mounted thereon, a releasable work clamp coacting with each element, separate shiftable means for opening each of the elements of each of the sets to a continuous supply of compressed air at the start of movement of each set in its path of travel, spring controlled normally inactive spaced shifting devices, each common to a set of elements, supported by and depending upon the movement of the carrier for actuating the separate shiftable means of the set to an extent sufficient for simultaneously cutting off the compressed air to and then for simultaneously opening all of the elements of the set to the atmosphere when the set travels a distance greater than half of and less than the distance of the complete path in which it moves, spring controlled normally inactive spaced shiftable releasing devices, each common to the work clamps of a set of elements, supported by and depending upon the movement of the carrier for simultaneously releasing the work clamps of the set subsequent to the opening of the elements of the set to the atmosphere and before the set completes its path of travel, and a stationary cam mechanism common to and arranged in the path of the shifting and releasing devices for actuating them.

8. In a sole leveling, shaping and securing machine, a revolving carrier, spaced independent sets of compressed air operated sole leveling, shaping and securing elements bodily moving with the carrier in a circular path, each of said elements of each of the sets adapted to have the work mounted thereon, a releasable work clamp coacting with each element, separate shiftable means for opening each of the elements of each of the sets to a continuous supply of compressed air at the start of movement of each set in its path of travel, spring controlled normally inactive spaced shifting devices, each common to a set of elements, supported by and depending upon the movement of the carrier for actuating the separate shiftable means of the set to an extent sufficient for simultaneously cutting off the compressed air to and then for simultaneously opening all of the elements of the set to the atmosphere when the set travels a distance greater than half of and less than the distance of the complete path in which it moves, spring controlled normally inactive spaced shiftable releasing devices, each common to the work clamps of a set of elements, supported by and depending upon the movement of the carrier for simultaneously releasing the work clamps of the set subsequent to the opening of the elements of the set to the atmosphere and before the set completes its path of travel, a stationary cam mechanism common to and arranged in the path of the shifting and releasing devices for actuating them, and a stop for each of said releasing devices for limiting the return movement thereof for holding them in normal position.

9. In a sole leveling, shaping and securing machine, a revolving carrier, spaced independent sets of compressed air operated sole leveling, shaping and securing elements bodily moving with the carrier in a circular path, each of said elements of each of the sets adapted to have the work mounted thereon, a releasable work clamp coacting with each element, separate shiftable means for opening each of the elements of each of the sets to a continuous supply of compressed air at the start of movement of each set in its path of travel, spring controlled normally inactive spaced shifting devices, each common to a set of elements, supported by and depending upon the movement of the carrier for actuating the separate shiftable means of the set to an extent sufficient for simultaneously cutting off the compressed air to and then for simultaneously opening all of the elements of the set to the atmosphere when the set travels a distance greater than half of and less than the distance of the complete path in which it moves, spring controlled normally inactive spaced shiftable releasing devices, each common to the work clamps of a set of elements, supported by and depending upon the movement of the carrier for simultaneously releasing the work clamps of the set subsequent to the opening of the elements of the set to the atmosphere and before the set completes its path of travel, and a stop for each of said releasing devices for limiting the return movement thereof for holding them in normal position.

10. In a sole leveling, shaping and securing machine, a revoluble carrier, spaced sets of compressed air operated sole leveling, shaping and securing elements mounted on, bodily moving with the carrier and traveling in a circular path, said units including means for opening them to a continuous supply of compressed air and clamping means for the work operated upon, means depending upon the movement of the carrier for successively acting upon said sets to simultaneously open the units of each set to the atmosphere previous to the release of the clamping means of the units of the set simultaneously releasing the work thereon, a driving means for the carrier, and means carried by and depending upon the movement of the carrier for intermittently arresting the drive of the latter from its driving means.

11. In a sole leveling, shaping and securing machine, a revoluble carrier, spaced sets of compressed air operated sole leveling, shaping and securing elements mounted on, bodily moving with the carrier and travelling in a circular path, said units including means for opening them to a continuous supply of compressed air and clamping means for the work operated upon, means depending upon the movement of the carrier for successively acting upon said sets to simultaneously open the units of each set to the atmosphere previous to the release of the clamping means of the units of the set simultaneously releasing the work thereon, a driving means for the carrier, means mounted on and depending upon the movement of the carrier for intermittently arresting the drive of the latter from its driving means, and means for adjusting the means for intermittently arresting the drive of the carrier from its driving means.

12. In a sole leveling, shaping and securing means, an intermittently revoluble carrier including a hollow operating shaft for communication with a continuous supply of compressed air, compressed air operated sole leveling, shaping and securing units, for carrying the work to be operated upon, arranged in spaced sets, supported upon and bodily moving with the carrier in a circular path, independent means for opening each of said units to the interior of said shaft to provide for the unit to receive a continuous supply of compressed air, means depending upon the movement of the carrier for simultaneously opening the units of a set to the atmosphere, simultaneously cutting off of the air supply to the units of the set and for simultaneously releasing the work carried by the units of the set at a point between half and the complete distance of travel of the set, a driving means for said shaft, and means mounted on and depending upon the movement of the carrier for intermittently arresting the drive of the shaft from said driving means.

13. In a sole leveling, shaping and securing means, an intermittently revoluble carrier including a hollow operating shaft for communication with a continuous supply of compressed air, compressed air operated sole leveling, shaping and securing units, for carrying the work to be operated upon, arranged in spaced sets, supported upon and bodily moving with the carrier in a circular path, independent means for opening each of said units to the interior of said shaft to provide for the unit to receive a continuous supply of compressed air, means depending upon the movement of the carrier for simultaneously opening the units of a set to the atmosphere, simultaneously cutting off of the air supply to the units of the set and for simultaneously releasing the work carried by the units of the set at a point between half and the complete distance of travel of the set, a driving means for said shaft, means mounted on and depending upon the movement of the carrier for intermittently arresting the drive of the shaft from said driving means, and means for adjusting the means for intermittently arresting the operation of the shaft from its driving means.

14. In a machine for simultaneously leveling, shaping and securing a sole to an upper positioned on a last, a revoluble cylindrical continuous structure operating on a horizontal axis, said structure being provided with circumferentially disposed spaced sets of inflatable compressed air operated sole leveling, shaping and securing units extending lengthwise thereof and an independent set of releasable spaced work holding devices coacting with each set of said units for clamping the work on the latter during the revolving of said structure, supporting means for suspending said structure, and an electrically operated drive for revolving said structure, said structure and supporting means provided with coacting elements for intermittently arresting automatically the revolving movement of said structure at spaced intervals for successively positioning said sets of units and sets of devices at like predetermined spaced points respectively after and in proximity to the completion of the sole leveling, shaping and securing operation.

15. In a machine for simultaneously leveling, shaping and securing a sole to an upper positioned on a last, a revoluble cylindrical continuous structure operating on a horizontal axis, said structure being provided with circumferentially disposed spaced sets of inflatable compressed air operated sole leveling, shaping and securing units extending lengthwise thereof and an independent set of releasable spaced work holding devices coacting with each set of said units for clamping the work on the latter during the revolving of said structure, supporting means for suspending said structure, and an electrically operated drive for revolving said structure, said structure and supporting means provided with coacting elements for intermittently arresting automatically the revolving movement of said structure at spaced intervals for successively positioning said sets of units and sets of devices at like predetermined spaced points respectively after and in proximity to the completion of the sole leveling, shaping and securing operation, the said coacting element provided on said structure being adjustable relative to the coacting element provided on said supporting means for varying the like positioning point for said units after the completion of the sole leveling, shaping and securing operation.

16. In a machine for simultaneously leveling, shaping and securing a sole to an upper positioned on a last, a revoluble structure carrying inflatable compressed air operated sole leveling, shaping and securing units disposed circumferentially thereof and a releasable work holding means coacting with each of said units for clamping the work on the latter during the revolving of said structure, supporting means for suspending said structure, an electrically operated drive for revolving said structure, said structure and supporting means provided with coacting elements for intermittently arresting automatically the revolving movement of said structure at spaced intervals for successively positioning each of said units at a like predetermined point after and in proximity to the completion of the sole leveling, shaping and securing operation, an actuatable deflating device for each of said units, an actuatable releasing device for each of said work holding means, the said actuatable deflating devices for said units being alternately disposed with respect to and leading the actuatable releasing devices for said work holding means, said devices being disposed circumferentially of and bodily carried with said structure and having the actuation thereof dependent upon the movement of the latter, and means connected to said supporting means, located below said structure and arranged in the path of said inflating and releasing devices for actuating them at the completion of the sole leveling, shaping and securing operation.

17. In a machine for simultaneously leveling, shaping and securing a sole to an upper positioned on a last, a revoluble structure carrying inflatable compressed air operated sole leveling, shaping and securing units disposed circumferentially thereof and a releasable work holding means coacting with each of said units for clamping the work on the latter during the revolving of said structure, supporting means for suspending said structure, an electrically operated drive for revolving said structure, said structure and supporting means provided with coacting elements for intermittently arresting automatically the revolving movement of said structure at spaced intervals for successively positioning each of said units at a like predetermined point after and in proximity to the completion of the sole leveling, shaping and securing operation, the said coacting element provided on said structure being adjustable relative to the coacting element provided on said supporting means for varying the like positioning point for said units after the completion of the sole leveling, shaping and securing operation, an actuatable deflating device for each of said units, an actuatable releasing device for each of said work holding means, the said actuatable deflating devices for said units being alternately disposed with respect to and leading the actuatable releasing devices for said work holding means, said devices being disposed circumferentially of and bodily carried with said structure and having the actuation thereof dependent upon the movement of the latter, and means connected to said supporting means, located below said structure and arranged in the path of said inflating and releasing devices for actuating them at the completion of the sole leveling, shaping and securing operation.

18. In a machine for simultaneously leveling, shaping and securing a sole to an upper positioned on a last, a revoluble structure carrying inflatable compressed air operated sole leveling, shaping and securing units disposed circumferentially thereof and a releasable work holding means coacting with each of said units for clamping the work on the latter during the revolving of said structure, supporting means for suspending said structure, an electrically operated drive for revolving said structure, said structure and supporting means provided with coacting elements for intermittently arresting automatically the revolving movement of said structure at spaced intervals for successively positioning each of said units at a like predetermined point after and in proximity to the completion of the sole leveling, shaping and securing operation, an actuatable deflating device for each of said units, an actuatable releasing device for each of said work holding means, the said actuatable deflating devices for said units being alternately disposed with respect to and leading the actuatable releasing devices for said work holding means, said devices being disposed circumferentially of and bodily carried with said structure and having the actuation thereof dependent upon the movement of the latter, and adjustable means connected to said supporting means, located below said structure and arranged in the path of said inflating and releasing devices for actuating them at the completion of the sole leveling, shaping and securing operation.

19. In a machine for simultaneously leveling, shaping and securing a sole to an upper positioned on a last, a revoluble structure carrying inflatable compressed air operated sole leveling, shaping and securing units disposed circumferentially thereof and a releasable work holding means coacting with each of said units for clamping the work on the latter during the revolving of said structure, supporting means for suspending said structure, an electrically operated drive for revolving said structure, said structure and supporting means provided with coacting elements for intermittently arresting automatically the revolving movement of said structure at spaced intervals for successively positioning each of said units at a like predetermined point after and in proximity to the completion of the sole leveling, shaping and securing operation, the said coacting element provided on said structure being adjustable relative to the coacting element provided on said supporting means for varying the like positioning point for said units after the completion of the sole leveling, shaping and securing operation, an actuatable deflating device for each of said units, an actuatable releasing device for each of said work holding means, the said actuatable deflating devices for said units being alternately disposed with respect to and leading the actuatable releasing devices for said work holding means, said devices being disposed circumferentially of and bodily carried with said structure and having the actuation thereof dependent upon the movement of the latter, and adjustable means connected to said supporting means, located below said structure and arranged in the path of said inflating and releasing devices for actuating them at the completion of the sole leveling, shaping and securing operation.

20. In a machine for simultaneously leveling, shaping and securing a sole to an upper positioned on a last, a revoluble structure carrying inflatable compressed air operated sole leveling, shaping and securing units disposed circumferentially thereof and a releasable work holding means coacting with each of said units for clamping the work on the latter during the revolving of said structure, supporting means for suspending said structure, an electrically operated drive for revolving said structure, said structure and supporting means provided with coacting elements for intermittently arresting automatically the revolving movement of said structure at spaced intervals for successively positioning each of said units at a like predetermined point after and in proximity to the completion of the sole leveling, shaping and securing operation, an actuatable deflating device for each of said units, an actuatable releasing device for each of said work holding means, the said actuatable deflating devices for said units being alternately arranged with respect to and leading the actuatable releasing devices for said work holding means, said inflating and releasing devices being disposed circumferentially of, bodily carried with, extended at one end from one end of and having the actuation thereof dependent upon the movement of said structure, said devices being spring controlled, and means connected to said supporting means, located below said structure and arranged in the path of and engageable with the extended ends of said inflating and releasing devices for actuating the latter at the completion of the sole leveling, shaping and securing operation.

21. In a machine for simultaneously leveling, shaping and securing a sole to an upper positioned on a last, a revoluble structure carrying inflatable compressed air operated sole leveling, shaping and securing units disposed circumferentially thereof and a releasable work holding means coacting with each of said units for clamping the work on the latter during the revolving of said structure, supporting means for suspending said structure, an electrically operated drive for revolving said structure, said structure and supporting means provided with coacting elements for intermittently arresting automatically the revolving movement of said structure at spaced intervals for successively positioning each of said units at a like predetermined point after and in proximity to the completion of the sole leveling, shaping and securing operation, the said coacting element provided on said structure being adjustable relative to the coacting element provided on said supporting means for varying the like positioning point for said units after the completion of the sole leveling, shaping and securing operation, an actuatable deflating device for each of said units, an actuatable releasing device for each of said work holding means, the said actuatable deflating devices for said units being alternately arranged with respect to and leading the actuatable releasing devices for said work holding means, said devices being disposed circumferentially of, bodily carried with, extended at one end from one end of and having the actuation thereof dependent upon the movement of said structure, said inflating and releasing devices being spring controlled, and means connected to said supporting means, located below said structure and arranged in the path of and engageable with the extended ends of said inflating and releasing devices for actuating the latter at the completion of the sole leveling, shaping and securing operation.

22. In a machine for simultaneously leveling, shaping and securing a sole to an upper upon a last, a lengthwise continuous revoluble structure operating on a horizontal axis and carrying lengthwise sets of spaced parallel inflatable releasable compressed air operated sole leveling, shaping and securing mechanisms, said sets of mechanisms arranged circumferentially of said structure and disposed in a tandem-like manner with respect to each other, supporting means for suspending said structure, and driving means for said structure, said structure and supporting means provided with coacting elements for intermittently arresting automatically the revolving movement of said structure at spaced intervals for successively positioning each of said sets of mechanisms at a like predetermined point after and in close proximity to the completion of the sole leveling, shaping and securing operation by the mechanism of a set.

23. In a machine for simultaneously leveling, shaping and securing a sole to an upper upon a last, a lengthwise continuous revoluble structure operating on a horizontal axis and carrying lengthwise sets of spaced parallel inflatable releasable compressed air operated sole leveling, shaping and securing mechanisms, said sets of mechanisms arranged circumferentially of said structure and disposed in a tandem-like manner with respect to each other, supporting means for suspending said structure, driving means for said structure, and means at the corresponding ends of said structure and support for intermittently arresting automatically the revolving of said structure for successively positioning each of said sets of mechanisms at a like predetermined point after and in close proximity to the completion of the sole leveling, shaping and securing operation.

24. In a machine for simultaneously leveling, shaping and securing a sole to an upper upon a last, a cylindrical revoluble structure operating on a horizontal axis and carrying sets of inflatable compressed air operated sole leveling, shaping and securing mechanisms, said sets of mechanisms arranged circumferentially of said structure and disposed in a tandem-like manner with respect to each other, supporting means for suspending said structure, driving means for said structure, said structure and supporting means provided with coacting elements for intermittently arresting automatically the revolving movement of said structure at spaced intervals for successively positioning each of said sets of mechanisms at a like predetermined point after and in close proximity to the completion of the sole leveling, shaping and securing operation by the mechanism of a set, and means dependent upon the movement of said structure for successively deflating and unclamping the said sets of mechanisms at the completion of the sole leveling, shaping and securing operation by the mechanisms of each set.

25. In a machine for simultaneously leveling, shaping and securing a sole to an upper upon a last, a cylindrical revoluble structure operating on a horizontal axis and carrying sets of inflatable compressed air operated sole leveling, shaping and securing mechanisms, said sets of mechanisms arranged circumferentially of said structure and disposed in a tandem-like manner with respect to each other, supporting means for suspending said structure, driving means for said structure, means at one end of said supporting means and on said structure for intermittently arresting automatically the revolving of said structure for successively positioning each of said sets of mechanisms at a like predetermined point after and in close proximity to the completion of the sole leveling, shaping and securing operation, and means dependent upon the movement of said structure for successively deflating and unclamping the said sets of mechanisms at the completion of the sole leveling, shaping and securing operation by the mechanisms of each set.

26. In a machine for simultaneously leveling, shaping and securing a sole to an upper upon a last, a cylindrical revoluble structure operating on a horizontal axis and carrying sets of inflatable compressed air operated sole leveling, shaping and securing mechanisms provided with means for latching the work thereon, supporting means for suspending said structure, means dependent upon the movement of said structure for automatically deflating and releasing said mechanisms for the work during the revolving of the structure, and an electrically operated driving means for said structure, said structure and supporting means provided with coacting elements for intermittently arresting automatically the revolving movement of the carrier at spaced intervals for successively positioning each of said sets at a like predetermined point after and in close proximity to the completion of the sole leveling, shaping and securing operation by the mechanisms of a set.

27. In a machine for simultaneously leveling, shaping and securing a sole to an upper upon a last, a cylindrical revoluble structure operating on a horizontal axis and carrying sets of automatically deflatable and releasable compressed air operated sole leveling, shaping and securing mechanisms, supporting means for suspending said structure, an electrically operated driving means for said structure, said structure and supporting means provided with coacting elements for intermittently arresting automatically the revolving movement of the carrier at spaced intervals for successively positioning each of said sets at a like predetermined point after and in close proximity to the completion of the sole leveling, shaping and securing operation by the mechanisms of a set, and means dependent upon the movement of said structure for successively deflating and releasing the said sets of mechanisms at the completion of the sole leveling, shaping and securing operation by the mechanisms of each set.

28. In a machine for simultaneously leveling, shaping and securing a sole to an upper upon a last, a cylindrical revoluble structure operating on a horizontal axis and provided with independent sets of automatically deflatable and releasable compressed air operated sole leveling, shaping and securing mechanisms, a pair of supports for said structure, and an electrically operated driving mechanism for said structure operatively engaging with one end of the latter, said structure and one of said supports having coacting elements for intermittently arresting automatically the revolving movement of the carrier at spaced intervals for successively positioning each of said sets at a like predetermined point after and in close proximity to the completion of the sole leveling, shaping and securing operation by the mechanisms of a set, and said structure and said other support having coacting elements dependent upon the movement of said structure for successively deflating and releasing each set of mechanisms on the completion by the latter of the sole leveling, shaping and securing operation.

29. In a sole leveling, shaping and securing machine, a compressed air operated sole leveling, shaping and securing structure including means for removably clamping thereon the work to be operated upon, a carrier for said structure moving in a circular path, shiftable means mounted on the carrier for opening said structure to a continuous supply of compressed air on the start of movement of said structure in its path of travel, a pair of sidewise opposed cam plates located below and adjacent one end of said carrier, and means dependent upon the movement of the carrier and traveling upon said plates for actuating successively said shiftable means and clamping means for respectively shutting off the continuous compressed air supply to said structure, opening said structure to the atmosphere and for releasing the work when the carrier travels a distance greater than half of and less than the distance of the complete path in which it travels.

30. In a sole leveling, shaping and securing machine, a compressed air operated sole leveling, shaping and securing structure including means for removably clamping thereon the work to be operated upon, a carrier for said structure moving in a circular path, shiftable means mounted on the carrier for opening said structure to a continuous supply of compressed air on the start of movement of said structure in its path of travel, a pair of sidewise opposed cam plates located below said carrier, and means dependent upon the movement of the carrier and travelling upon said plates for actuating successively said shiftable means and clamping means for respectively shutting off the continuous compressed air supply to said structure, opening said structure to the atmosphere and for releasing the work when the carrier travels a distance greater than half of and less than the distance of the complete path in which it travels, said plates arranged in substantial alignment with respect to one end of the carrier, and said means dependent upon the movement of the carrier extended from the said end thereof.

31. In a sole leveling, shaping and securing machine, a compressed air operated sole leveling, shaping and securing structure including means for removably clamping thereon the work to be operated upon, a carrier for said structure moving in a circular path, shiftable means mounted on the carrier for opening said structure to a continuous supply of compressed air on the start of movement of said structure in its path of travel, a pair of sidewise opposed cam plates below one end of said carrier, and a pair of rockable elements mounted on and extended from said end of the carrier, dependent upon the movement of the latter and coacting with said plates and shiftable means for successively cutting off the air supply to said structure, opening the structure to the atmosphere and releasing the work when the carrier travels a distance greater than half of and less than the distance of the complete path in which it travels.

32. In a sole leveling, shaping and securing machine, a compressed air operated sole leveling, shaping and securing structure including means for removably clamping thereon the work to be operated upon, a carrier for said structure moving in a circular path, shiftable means mounted on the carrier for opening said structure to a continuous supply of compressed air on the start of movement of said structure in its path of travel, a pair of sidewise opposed cam plates located below said carrier, means dependent upon the movement of the carrier and travelling upon said plates for actuating successively said shiftable means and clamping means for respectively shutting off the continuous compressed air supply to said structure, opening said structure to the atmosphere and for releasing the work when the carrier travels a distance greater than half of and less than the distance of the complete path in which it travels, said plates arranged in substantial alignment with respect to one end of the carrier, said means dependent upon the movement of the carrier extended from the said end thereof, and means for adjusting said plates.

33. In a sole leveling, shaping and securing machine, a continuous skeleton cylindrical carrier operating upon a horizontal axis, spaced sets of compressed air operated sole leveling, shaping and securing elements disposed circumferentially with respect to, bodily moving with and extending lengthwise of the carrier, means for opening and for maintaining each of said elements to an inflating continuous compressed air supply therefor during the revolving of the carrier, spaced actuatable independent units supported lengthwise of and extended at one end from one end of the carrier and each coacting with said means of a set of elements, each unit having its operation dependent upon the movement of the carrier and operating said means for simultaneously deflating the elements of a set when the latter travels a distance more than half of and less than the complete distance of its path, and a structure located adjacent to the carrier, common to said units and successively engaging the extended ends of the units for successively actuating the latter during revolving of the carrier, said units being journaled in said carrier, the other ends of said units being spring controlled.

34. In a sole leveling, shaping and securing machine, a continuous skeleton cylindrical carrier operating upon a horizontal axis, spaced sets of compressed air operated sole leveling, shaping and securing elements disposed circumferentially with respect to, bodily moving with and extending lengthwise of the carrier, means for opening and for maintaining each of said elements to an inflating continuous compressed air supply therefor during the revolving of the carrier, spaced actuatable independent units supported lengthwise of and extended at one end from one end of the carrier and each coacting with said means of a set of elements, each unit having its operation dependent upon the movement of the carrier and operating said means for simultaneously deflating the elements of a set when the latter travels a distance more than half of and less than the complete distance of its path, a structure located adjacent to the carrier, common to said units and successively engaging the extended ends of the units for successively actuating the latter during revolving of the carrier, work clamping devices supported by the carrier and coacting with the elements of said sets and bodily moving with the latter, and spaced actuatable releasing units for said devices supported lengthwise of and extending from one end of the carrier and arranged in proximity to said other unit, each releasing unit having its operation dependent upon the movement of the carrier and releasing simultaneously the clamping devices associated with the elements of a set when the latter travels a distance more than half of and less than the complete distance of its path, the said structure common to the units coacting with said elements having means for successive engagement with the extended ends of said releasing units for successively actuating the latter subsequently to the actuation of the units coacting with said elements, said units being journaled in said carrier, the other ends of said units being spring controlled.

35. In a sole leveling, shaping and securing machine, a revolving structure operating upon a horizontal axis and including a pair of spaced parallel discs and a circular row of tie bars connecting the discs together, spaced tubular members connected with the discs and arranged parallel to said bars, a hollow operating shaft for and disposed axially of said structure and adapted to be connected to a compressed air supply, means common to said members for establishing communication between the latter and said shaft, sets of brackets, the brackets of each set being secured to a bar and member, sets of compressed air operated sole leveling, shaping and securing elements, each of said elements being connected with each bracket and having valve means for establishing communication between it and a member to provide for a continuous supply of compressed air thereto during the revolving of said structure, a set of latchable work clamping devices for each set of said elements, each of said devices supported on a bar and a member adjacent a bracket and extending over an element, sets of actuatable latching units carried by the sets of brackets and each unit being associated with a clamping device for latching the latter in work clamping position, and sets of releasing units carried by said sets of brackets and each set of units common to the said valve means of a set of said elements for shifting said valve means in a direction to provide for the simultaneous deflation of the elements of the set, and said units provided with normally inactive shiftable extensions having their operation dependent upon the movement of the carrier and acting when shifted from normal to operate said units to provide for the simultaneous deflation of the elements of a set and then the simultaneous release of the clamping devices associated with the set during the revolving of said structure.

36. In a sole leveling, shaping and securing machine, a revolving structure operating upon a horizontal axis and including a pair of spaced parallel discs and a circular row of tie bars connecting the discs together, spaced tubular members connected with the discs and arranged parallel to said bars, a hollow operating shaft for and disposed axially of said structure and adapted to be connected to a compressed air supply, means common to said members for establishing communication between the latter and said shaft, sets of brackets, the brackets of each set being secured to a bar and member, sets of compressed air operated sole leveling, shaping and securing elements, each of said elements being connected with each bracket, and having valve means for establishing communication between it and a member to provide for a continuous supply of compressed air thereto during the revolving of said structure, a set of latchable work clamping devices for each set of said elements, each of said devices supported on a bar and a member adjacent a bracket and extending over an element, sets of actuatable latching units carried by the sets of brackets and each unit being associated with a clamping device for latching the latter in work clamping position, sets of releasing units carried by said sets of brackets and each set of units common to the said valve means of a set of said elements for shifting said valve means in a direction to provide for the simultaneous deflation of the elements, of the set, and said units provided with normally inactive shiftable extensions having their operation dependent upon the movement of the carrier and acting when shifted from normal to operate said units to provide for the simultaneous deflation of the elements of a set and then the simultaneous release of the clamping devices associated with the set during the revolving of said structure, and an actuatable means for said extensions located adjacent the carrier and engageable with the extensions during the revolving of said structure to alternately shift the extensions of releasing units with respect to the shifting of the extensions of the actuatable latching units.

37. In a sole leveling, shaping and securing machine, a revoluble carrier, operating means for the carrier including a hollow driven shaft adapted to communicate at one end with a compressed air supply, spaced sets of compressed air operated sole leveling, shaping and securing elements disposed circumferentially with respect to and bodily moving with said carrier, each of said elements having means for establishing communication therebetween and said shaft and for maintaining a continuous supply of compressed air to the element during the revolving of the carrier, means on the carrier and dependent upon the movement of the carrier for successively opening the sets of elements to the atmosphere, and operable means at the other end of the shaft for simultaneously opening the sets of elements to the atmosphere.

38. In a sole leveling, shaping and securing machine, a tubular operating shaft, a compressed air supply opening into said shaft, a carrier revolved by said shaft, spaced sets of compressed air operated sole leveling, shaping and securing elements bodily moving with and anchored to the carrier, a compressed air conducting structure leading from said shaft, bodily moving with the carrier and shaft and common to said elements, independent means for opening the elements of each set to said structure and for maintaining a continuous supply of compressed air to the elements of each set during the revolving of the carrier, successively operated actuatable structures, each common to the maintaining means of a set, each actuatable structure bodily carried with and having its actuation dependent upon the movement of the carrier and when actuated operating the maintaining means of a set for simultaneously opening the elements of the latter to the atmosphere, and shiftable means carried by the shaft for opening the said sets of elements simultaneously to the atmosphere.

GEORGE LAGANAS.